(No Model.)
H. C. PRICE.
PHOTOGRAPHIC CAMERA.
No. 260,605. Patented July 4, 1882.
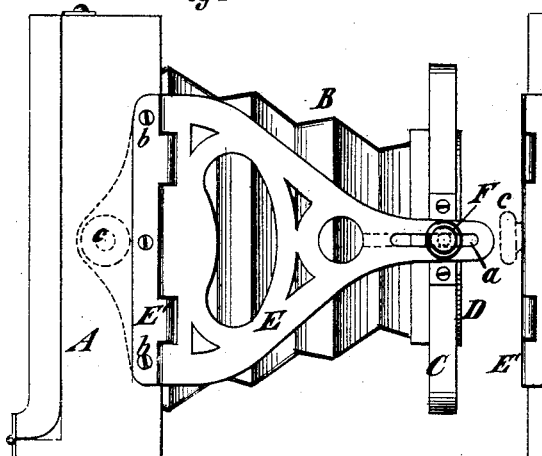
Witnesses
T. H. Keane
James R. Bowen
Inventor
H. Clay Price
By his atty.
Edwin H. Brown

UNITED STATES PATENT OFFICE.

H. CLAY PRICE, OF MONTCLAIR, NEW JERSEY, ASSIGNOR TO THE SCOVILL MANUFACTURING COMPANY, OF WATERBURY, CONNECTICUT.

PHOTOGRAPHIC CAMERA.

SPECIFICATION forming part of Letters Patent No. 260,605, dated July 4, 1882.

Application filed January 11, 1882. (No model.)

*To all whom it may concern:*

Be it known that I, HENRY CLAY PRICE, of Montclair, in the county of Essex and State of New Jersey, have invented certain new and useful Improvements in Photographic Cameras, of which the following is a specification.

The object of my present improvements is to provide for contracting a photographic camera into a very small space to render it convenient for transportation.

To this end my improvements consist in the combination, with a camera-body composed of a shallow box and an extensible portion, to which the front is attached, of a frame or frames connected to the said box and also to the front, whereby the extensible portion of the body, and preferably, also, the front, may be contracted within the box, and the frame or frames laid across it. Preferably two of the frames mentioned will be used, and they will be hinged to the sides of the box. They may advantageously have such a connection with the front of the camera-body as to provide for adjusting the same forward and backward, as also at different angles vertically or laterally. If the hinges of the frames are connected to the sides of the box by single screws, the frames may be shifted to adjust the front up or down.

In the accompanying drawings, Figure 1 is a side view of a camera-body embodying my improvements and showing the same extended. Fig. 2 is a top view thereof, and Fig. 3 is a front view of the same contracted.

Similar letters of reference designate corresponding parts in all the figures.

A designates a shallow box, which may be made of wood or other material, and forming part of the camera-body.

B designates an extensible portion of the body, made of leather or other suitable material, and of a bellows-like construction. To this bellows-like portion B is attached the front C of the camera-body. This front C is provided with a screw-socket, D, whereby the lens-tube may be secured to it.

E designates two frames, which may be made of brass or other suitable material, and which, at the rear end, are connected to the sides of the box A by hinges E'. At the forward end they are provided with slots $a$, in which fit screws F, which enter the front C of the camera-body, and may be manipulated to clamp it in positions. The hinges E' will preferably generate sufficient friction to prevent the frames E from swinging too easily sidewise. By loosening the screws F the front C may be moved forward or backward, and it may be secured in any position by tightening the screws. By thus operating the screws the front may also be adjusted and secured at different angles to a vertical plane, and by shifting and securing one side of the front farther forward or backward than the other the front may be adjusted at different angles laterally.

The hinges E' may be secured to the box A by a number of small screws, $b$, as illustrated in bold outline, or they may be secured thereto by single screws $c$, as indicated in dotted outline. In the latter case the frames may be swung upward or downward, so as to elevate or lower the front of the camera-body; but the screws $c$ must exert sufficient friction to hold them in position.

When the camera is not desired to be used the screws F may be detached, the extensible portion B and the front C of the body of the camera may be contracted into the box A, and the frames E may be folded over the front. The camera-body will then be compact, so that it may be easily carried in the pocket. Of course the slots $a$ in the frames E may be open at the outer ends, so as to permit the frames being disengaged from the front of the camera-body without detaching the screws F. The usual ground-glass frame will be attached to the rear end of the box A.

It will be seen that by my improvements I produce a simple camera, which may be easily contracted into compact shape for carrying from place to place.

I do not claim the broad idea of a camera composed of a box and an extensible body, to which the front is attached, and which is adapted to be contracted and received within the box when not in use.

What I claim as my invention, and desire to secure by Letters Patent, is—

1. The combination, with a camera-body composed of a shallow box and an extensible portion, to which the front is attached, of a frame connected to the said box and front, whereby the extensible portion may be contracted within the box and the frame laid across the front, substantially as specified.

2. The combination, with a camera-body composed of a shallow box and an extensible portion, to which the front is attached, of two frames hinged to the sides of the box and connected to the front of the camera-body, so that the extensible portion may be contracted within the box and the frames folded across the front, substantially as specified.

3. The combination, with a camera-body composed of a shallow box and an extensible portion to which the front is attached, of two frames hinged to the sides of the box, so that when the extensible portion is contracted they may be folded across the front, and means whereby the front is connected to them, so as to afford the front an adjustment forward and backward, substantially as and for the purpose specified.

4. The combination, with a camera-body composed of a shallow box and an extensible portion, to which the front is attached, of two frames connected to the sides of the box by hinges in such manner that they may be folded across the front of said box and that they will admit of an upward and downward movement of said front, substantially as specified.

5. The combination, with a camera-body composed of a shallow box and an extensible portion, to which the front is attached, of two frames hinged to the sides of the box, so that they may be folded across it, and means connecting them to the front, so as to afford an adjustment of the latter at different angles, substantially as specified.

H. CLAY PRICE.

Witnesses:
T. J. KEANE,
JAMES R. BOWEN.